United States Patent [19]
Prain et al.

[11] Patent Number: 5,753,919
[45] Date of Patent: May 19, 1998

[54] GAMMA RAY DETECTION AND MEASUREMENT DEVICE

[75] Inventors: Kenneth A. Prain, Alford, Scotland; John H. Knight, Crathes, England

[73] Assignee: Geolink (UK) Limited, Aberdeen, United Kingdom

[21] Appl. No.: 765,972

[22] PCT Filed: May 9, 1996

[86] PCT No.: PCT/GB96/01111

§ 371 Date: Mar. 13, 1997

§ 102(e) Date: Mar. 13, 1997

[87] PCT Pub. No.: WO96/35964

PCT Pub. Date: Nov. 14, 1996

[30] Foreign Application Priority Data

May 13, 1995 [GB] United Kingdom ............... 9509755

[51] Int. Cl.$^6$ ............... G01T 1/20; G01V 5/06
[52] U.S. Cl. ............... 250/368; 250/361 R
[58] Field of Search ............... 250/254, 256, 250/361 R, 368

[56] References Cited

U.S. PATENT DOCUMENTS

| | | | |
|---|---|---|---|
| 2,702,352 | 2/1955 | Krasnow et al. | 250/83.6 |
| 2,902,603 | 9/1959 | Ferre | 250/368 |
| 4,158,773 | 6/1979 | Novak | 250/368 X |
| 4,900,937 | 2/1990 | Dayton et al. | 250/368 X |
| 4,904,865 | 2/1990 | Meisner et al. | 250/254 |
| 4,994,673 | 2/1991 | Perna et al. | 250/368 X |
| 5,652,429 | 7/1997 | Genna | 250/368 |

OTHER PUBLICATIONS

G. J. Fishman and D. M. Walker, "Large Volume, High Efficiency Scintillation Detectors Using Multiple NaI(Tl) Crystal Pieces," *Nuclear Instruments and Methods*, pp. 357–360 (1973).

*Primary Examiner*—David P. Porta
*Attorney, Agent, or Firm*—Madson & Metcalf

[57] ABSTRACT

A gamma ray detector and measurement device having a generally elongate housing (11); a scintillator module (12) movably mounted in the housing (11) and arranged to respond to the presence of gamma rays in the local environment in which the device is located and which rays pass through the wall (13) of the housing and into the scintillator module, the module having an optical output (14) for transmitting an optical signal based on converted incoming gamma rays and an optical transducer module (15) also movably mounted in the housing (11) and having an input (16) arranged to receive the optical output from the scintillator module, the transducer module being able to convert the instantaneous optical output into an electrical output corresponding to the energy and flux of the incoming gamma radiation as detected in the scintillator module; in which the output (14) of the scintillator module (12) and the input of the transducer module (15) are closely spaced to each other, and define a space (17) therebetween to be filled with an optical fluid to improve the transmission of the optical signal to the input of the transducer module; wherein a housing chamber (12a, 15a) is defined in the housing (11) which is communicable with the space (17) between the output (14) of the scintillator module (12) and the input (16) of the transducer module (15), and in that a flow restrictor is in communication with the chamber and/or the space and is arranged, in use, to restrict fluid flow between the chamber and the space for the purpose of damping movement of either or both of the modules within the housing.

15 Claims, 3 Drawing Sheets

GAMMA RAY DETECTION AND MEASUREMENT DEVICE

This invention relates generally to a gamma ray detection and measurement device which is intended to detect the presence of gamma ray emissions and to provide a measurement of the level of emissions.

The invention has been developed primarily to provide a measuring device or tool which can be used to measure the level of gamma ray emissions in a stratum which is being drilled i.e. to carry out gamma ray monitoring during drilling, in which case the device follows the drill bit fairly closely—typically being located between 1 and 50 feet above the drill bit, depending on the configuration of the drill-string and on the presence or absence of a drilling motor. Therefore the device has to be designed to be sufficiently robust to withstand the conditions prevailing in such an arduous environment i.e. temperature, pressure, vibration and shock loadings. Not only must the device be sufficiently robust or "ruggedised" to withstand these conditions without damage, but also it must be sufficiently sensitive so as to detect and measure relatively low levels of gamma ray emission while being exposed to these conditions.

Measurement-while-drilling (MWD) is a technique used during oil and gas well drilling to acquire data from instruments located near the drill-bit and transmit this data to the surface, as shown schematically in FIG. 1. The principal problems to be overcome are the survival of the instruments in an extremely hostile environment (temperature, pressure, shock and vibration) and the transmission of data from a location which is often thousands of meters below the surface of the earth.

There are several solutions to the transmission problem. The method most commonly used, shown schematically in FIG. 1 is to employ a device 1 near the instruments 2 which can in some way influence the circulation pressure drop of the usual drilling fluid which is employed. The consequent disturbances in fluid pressure can then be detected at the earth' surfacesby a suitable pressure transducer 3. Using a suitable coding scheme, data can be transmitted as pressure pulses, or variation in pressure pulses in the fluid column running up to the surface and then, for example, be decoded in an appropriate computer system 4. These basic techniques are well-known to those of ordinary skill in the art.

There are many useful measurements which can be made, but the most significant are the inclination to the vertical and also the compass heading of the bore hole which is being drilled. With this knowledge, the hole which is being drilled can be steered towards a specific target, without having to interrupt the drilling process to lower survey instruments down the well.

A second class of measurements which are carried out is related to the properties of the rock which is being drilled, and its hydrocarbon-bearing potential. It may also be useful to make engineering measurements at the bit, for example the applied load and the rotary torque.

One particularly useful measurement which can be carried out in an MWD technique is the measurement of the presence, and the level, of gamma ray emissions from various layers through which the drill bit is guided e.g. layers of shale, and sand-stone, since different types of layer give predictable levels of gamma ray emission. Even layers of the same material, but of different properties, can have different but predictable levels of gamma ray emission. Therefore, it is known to provide a downhole detector for measuring natural gamma ray emission, and one of the purposes of this measurement is to make a deduction about the type of rock or layer which is being drilled, by looking at the total gamma ray intensity, or at the spectral energy distribution of the gamma radiation, in the bore hole at the detector location. Another purpose is to correlate the sequence of rock formations with those which have already been determined in a nearby borehole. FIG. 1 shows schematically a gamma ray detector 5 which in this case is mounted above a drilling motor or other component of the drill string 6. The basic principles of these measurements and their interpretation have been established a long time ago, and will be well-known to those of ordinary skill in this art, and therefore need not be described in detail herein.

Bearing in mind the arduous operating environment, this imposes restrictions on the choice of detector which is used to monitor the emission of gamma radiation, and particularly the constraints imposed by the prevailing relatively high temperature, so that it is normal in such gamma ray detectors to use the Geiger-Muller tube, or an inorganic scintillator/photo multiplier combination, with the latter being much preferred because of its greater sensitivity. In certain applications the energy-discriminating property of the scintillation detector is also useful. However, the scintillator/photo multiplier combination is prone to operational disturbances caused by vibration and shock.

There are two specific sources of such disturbances, namely direct emission of non gamma-ray induced photons from the scintillator material, and spurious pulses generated in the photo multiplier tube and associated electronics components. It is therefore very important to package the scintillator and the photo multiplier tube in such a way as to attenuate, as far as possible, shock loading and vibration energy transmitted to the housing of the instruments during normal drilling operations.

One known method of protecting a scintillator assembly from some of the damaging effects of shock is to preload both the crystal and photomultiplier tube in compression against an optical coupling window. In a variant of this method, described in U.S. Pat. No. 4,900,937, the crystal is less strongly biased against the window and allowed to move away from it under the influence of shock: but this method is disadvantageous in that it intermittently breaks the optical coupling. In preferred embodiments of the present invention, as will be seen, a photomultiplier tube is free to move with the crystal but without any related disturbance to the optical coupling.

In U.S. Pat. No. 2,902,603 a method is described for thermally insulating a downhole scintillation detector. The patent describes the use of a fluid to improve optical contact between the face of a scintillation crystal and an optically flat window, and shows that if the crystal is made in hollow shape the cylindrical space within it may also be filled with fluid, provision being made for accomodating the thermal expansion of the fluid as in the present invention. However in the detector described in U.S. Pat. No. 2,902,603, the scintillator is intended to remain in intimate contact with the optical window and there is no provision for the fluid to serve as part of a motion damping system. The invention described in the above referenced Patent seeks to provide thermal protection but makes no special provision for protection against shock and vibration and indeed, since that invention refers to the application of so-called wireline logging, in which one or more instruments are lowered into a borehole on a cable, the need for shock and vibration protection is greatly reduced as compared with the MWD application.

For general information it is pointed out that in gamma radiation detection systems of the type described in this document the need for thermal protection has been superceded by the development of scintillators, optical transducers and associated eletronics which are capable of withstanding the high temperatures involved. Thermal protection is in any case irrelevant in the MWD application because the instrument may remain in the borehole for many days: this is in contrast with wireline operations in which the instruments only spend a relatively short time in the high temperature environment.

It is a particular advantage of the embodiments of the present invention that it allows the scintillator and optical transducer to move together as a unit within their own housing. In more conventional assemblies designed for MWD environments the scintillator and optical transducer are each held rigidly against a separating optical window: this is disadvantageous in that the low mass and relatively fragile optical transducer has to be held in compression against the optical window. In the presentt invention the low mass optical transducer is carried on the crystal and the two elements are allowed to move as a unit within the outer housing of the device. The present invention therefore seeks to provide a gamma ray detection and measurement device which is particularly suitable for use as a sensor in an MWD tool (although it should be understood that the invention is not restricted to such use), and which device has improved resistance to vibration and/or shock loadings so as to minimise loss of sensitivity and/or accuracy in gamma ray detection and measurement.

According to one aspect of the invention there is provided a gamma ray detection and measurement device which comprises:

a generally elongate housing;

a scintillator module movably mounted in said housing and arranged to respond to the presence of gamma rays in the local environment in which the device is located and which rays pass through the wall of the housing and into the scintillator module, said module having an optical output for transmitting an optical signal after conversion within the module of the incoming gamma rays; and an optical transducer module also movably mounted in the housing and having an input arranged to receive the light output from the scintillator module, said transducer module being able to convert the instantaneous light output into an electrical signal related to the gamma ray measurement;

in which the output of the scintillator module and the input of the transducer module are closely spaced to each other, and define a space therebetween to be filled with an optical fluid to improve the transmission of the optical signal to the input of the transducer module;

characterised in that a housing chamber is defined in said housing and which is communicable with said space between the output of the scintillator module and the input of said transducer module, and in that a flow restrictor is in communication with said chamber and/or said space and is arranged, in use, to restrict fluid flow between the chamber and said space for the purpose of damping movement of either or both of said modules within said housing.

Preferably, the device is completely filled with said optical fluid, which may be any one of known proprietary types of optical fluid used in gamma ray detector devices. Therefore, the optical fluid performs a dual function, namely it improves the transmission of the optical signal from the output of the scintillator module and to the input of the transducer module, but in addition it also comprises the damping medium which is caused to flow internally of the housing upon movement of either or both of the modules as a result of a shock or vibration loading applied to the housing.

Preferably, the two modules, namely the optical transducer and the scintillator are coupled rigidly together, to define a constant space therebetween which is filled with the optical fluid, and therefore they are movable as a unit within the housing, somewhat in the manner of a piston sliding within a cylinder.

Further advantages of using such a fluid are that it may be selected from a range of available viscosities thus enabling the extent of the damping to be appropriately controlled, that it may be designed to maintain a relatively constant viscosity with temperature, that it may be selected to be of a suitable refractive index to optimise the optical coupling, that it lubricates the damping mechanism and that it is electrically inert, thus avoiding disturbances to the electrical system of the optical detector.

Preferably, resilient means is arranged within the housing to resist reciprocating movement of the unit, and this may, by way of example only, comprise spring arrangements within the housing e.g. compression springs at each end of the housing, but of course many other types of resilient biasing means may be provided, such as bellows or elastomeric end caps.

When, as is preferred, the entire interior of the housing is filled with the optical fluid, (apart from the internal volume of the housing taken up by the two modules and associated components), and in order to provide compensation for thermal expansion of the optical fluid when exposed to the prevailing temperatures in which the device is operating, preferably a fluid expansion piston is mounted at one end of the housing and which can yield, in sealed manner, to allow for thermal expansion of the optical fluid. This function may alternatively be provided by a convoluted bellows or any other device which can readily accomodate changes in volume of the contained fluid.

The flow restrictor which is employed in a device according to the invention can take any suitable form, and indeed can be arranged internally or externally of the housing. However, for convenience, the flow restrictor will be mounted internally of the housing, and be arranged to be in the path of travel of the fluid as it is constrained to move when displaced by linear movement of the module(s) within the housing.

In a particularly advantageous and simplified arrangement, each module is slidably mounted within the housing in the manner of a piston, having one or more elastomeric rings mounted on its outer periphery, so as to provide a piston type of movement, but each ring may have one or more gaps or apertures formed in it, to allow restricted fluid flow through it, thereby to dampen the movement of the associated module.

In a particularly preferred embodiment of the invention, the housing chamber (which communicates with the fluid space between the scintillator module and the transducer module) is formed or defined in the housing by mounting at least one (and preferably both) modules with lateral clearance within the housing (so as to define the housing chamber between the outer wall surface of the module(s) and the inner wall surface of the housing).

Usually, the housing will be of circular cross-section, and each module also will be of circular cross-section, but of a smaller external diameter than the internal diameter of the housing, so as to define annular chambers between the inner wall of the housing and the outer surface of each module, and which are normally filled with the optical fluid. The optical fluid and the elastomeric rings therefore provide a cushioning against any tendency for the module assembly to move laterally in service, as a result of vibration or shock loadings applied to the housing.

When, as is a preferred use of the invention, the device is incorporated in a tool which is a part of the drill-string while drilling is taking place, the device may have suitable electronic modules in addition, to store measured gamma ray information, and also to pass such information, suitably coded, to the downhole transmitter and thence as required to suitable surface monitoring equipment. By this means, the natural gamma radiation emanating from the type of stratum which is being drilled can be regularly monitored together with changes in the nature of such radiation. This information may be used to make decisions related to the drilling process. For example, the information may be used to correlate the sequence of formations being drilled with these which have already been determined in a nearby borehole.

According to a further aspect of the invention there is provided a gamma ray detection and measurement device which comprises:

a generally elongate housing;

a scintillator module mounted for linear reciprocation in said housing and arranged to respond to the presence of gamma rays in the local environment in which the device is located and which rays pass through the wall of the housing and into the scintillator module, said module having an optical output for transmitting an optical signal after the incoming gamma rays have been converted within the module; and an optical transducer module also mounted for linear reciprocation in the housing and having an input arranged to receive the optical output signal from the scintillator module, said transducer module being able to convert the instantaneous optical output signal into a gamma ray measurement;

in which the optical output of the scintillator module and the input of the transducer module are closely spaced to each other, and define a space therebetween to be filled with an optical fluid, or a transparent elastomeric coupling medium of suitable refractive index to improve the transmission of the optical signal to the input of the transducer module;

the device being characterised in that:

1. the modules are coupled rigidly together as a unit for joint linear reciprocating movement in said housing;
2. resilient means is mounted in the housing to resist the linear reciprocating movement of said unit;
3. a pressure chamber is defined in said housing to contain a liquid damping medium which is exposed to pressure action upon reciprocation of said unit; and
4. a flow restrictor is in communication with said pressure chamber, directly or indirectly, to restrict flow of the damping medium through the restrictor upon reciprocation of said unit and thereby to damp the reciprocating movement of the unit.

Preferably, in a device according to the further aspect of the invention, the space between the modules is filled with a suitable elastomer and the remainder of the assembly is filled with fluid which functions as the liquid damping medium. By this means the properties of the optical coupling medium can be selected to be independent of those of the damping fluid. This may be advantageous in some cases, for example if it is necessary to select some property of the coupling medium, such as its refractive index, which is not compatible with the properties of the selected damping fluid.

A device according to either aspect of the invention is particularly suitable for use as a sensor in a so-called MWD tool, in which the device is exposed to vibration and shock loads while the drill bit is operating, and the flow restrictor provides a retardation on the flow of moving fluid, thereby to damp the reciprocating movement of the components in the housing.

By suitable design of the components and their internal arrangement within the housing, and bearing in mind a typical type of vibration and shock loading which may be applied in practice, it will be possible to select the parameters of the system, for example the viscosity of the damping fluid and the clearances in the mounting rings so that oscillation of the internal components can be kept within predetermined limits, thereby to limit the application of any undesired forces to the internal components of the scintillator module and the optical transducer module.

Preferred embodiments of the invention will now be described in detail, by way of example only, with reference to the accompanying drawings, in which:

FIG. 4b is a section on A—A in FIG. 4a; and,

Figure 1:
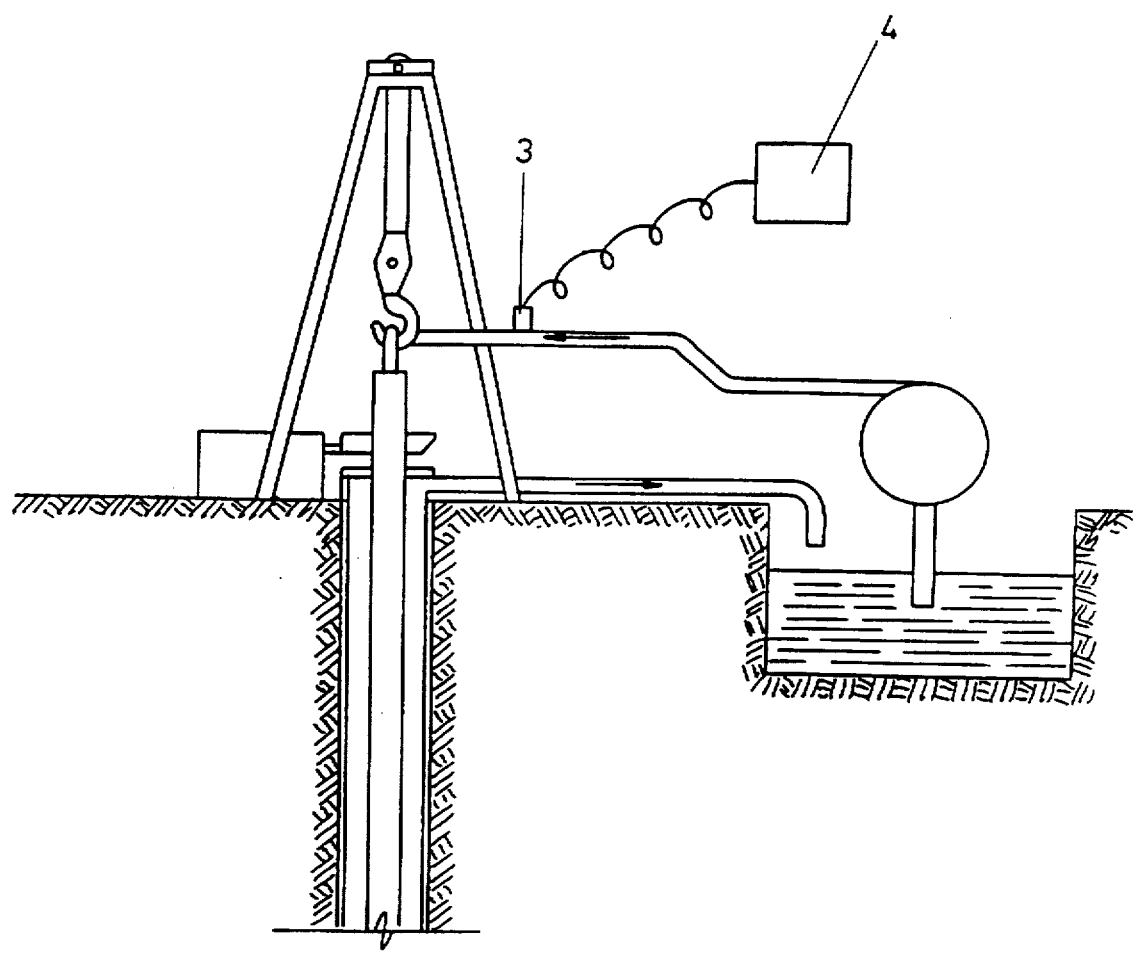
FIG. 1 (as referred to above) is a schematic drawing showing a typical mode of use of a gamma ray detector and measuring device according to the invention.
Figure 1:
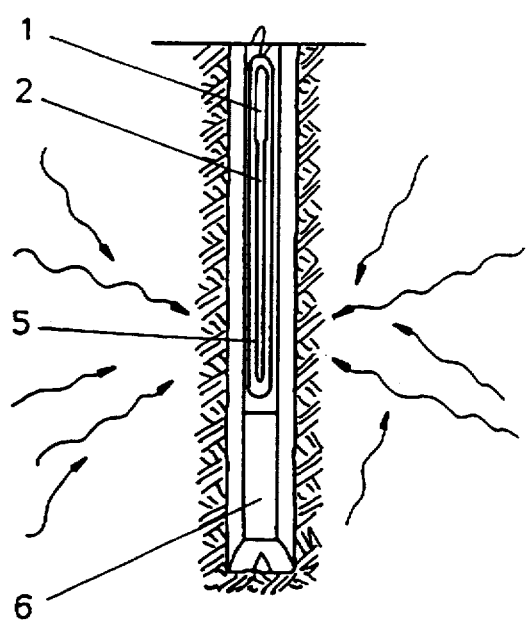

Referring now to the drawings, a gamma ray detector and measurement device according to the invention is designated generally by reference 10 and which is particularly suitable for use as a MWD tool. However, it should be understood that the device 10 is not restricted to such use, and indeed may be used in other environments in which improved resistance to vibration and/or shock loadings is desirable, so as to minimise loss of sensitivity and/or accuracy in gamma ray detection and measurement.

The device 10 comprises a generally elongate housing 11 of circular cross-section, and which is capable of being incorporated in a drill-string, so as closely to follow a drilling bit, and so that it can carry out gamma ray detection and measurement while the drill bit is operating. Typically, the device 10 may be located between 1 and 50 feet above the drill bit, the particular arrangement depending on the requirements for the so-called bottom hole assembly of the drill string. It will be appreciated that, in drilling for gaseous and liquid hydrocarbons, drilling of the bore hole takes place through successive layers of different types of rock e.g. sand-stone and shale, and the device 10 will be exposed both to relatively high temperature and also to application of substantial vibration energy, and occasional shock loadings, during the drilling process.

Figure 3:
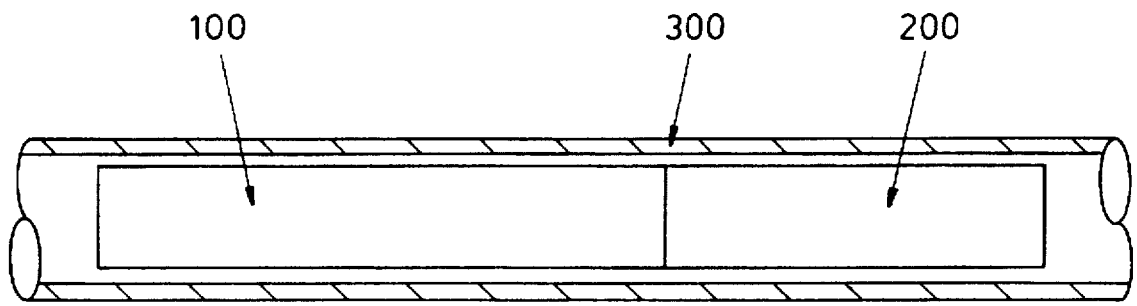
FIG. 3 shows, for comparison purposes, how a detector assembly is typically mounted in known installations in an external housing to protect it and its associated electronics from wellbore pressure.

Referring to FIG. 3, this shows a known arrangement to provide protection from the very high pressure which may be encountered in a wellbore by mounting the detector 100 and its associated electronic circuitry 200 in an external pressure barrel 300. However, because the protecting pressure housings are limited in diameter by the constraints of the drilling equipment, it is necessary to design the device 10 to be suitably rugged, so as to maintain the required level of sensitivity and accuracy in gamma ray detection and measurement and to provide adequate protection from the external shock and vibration which arises from the proximity of the instrument to the drilling bit.

Figure 2:
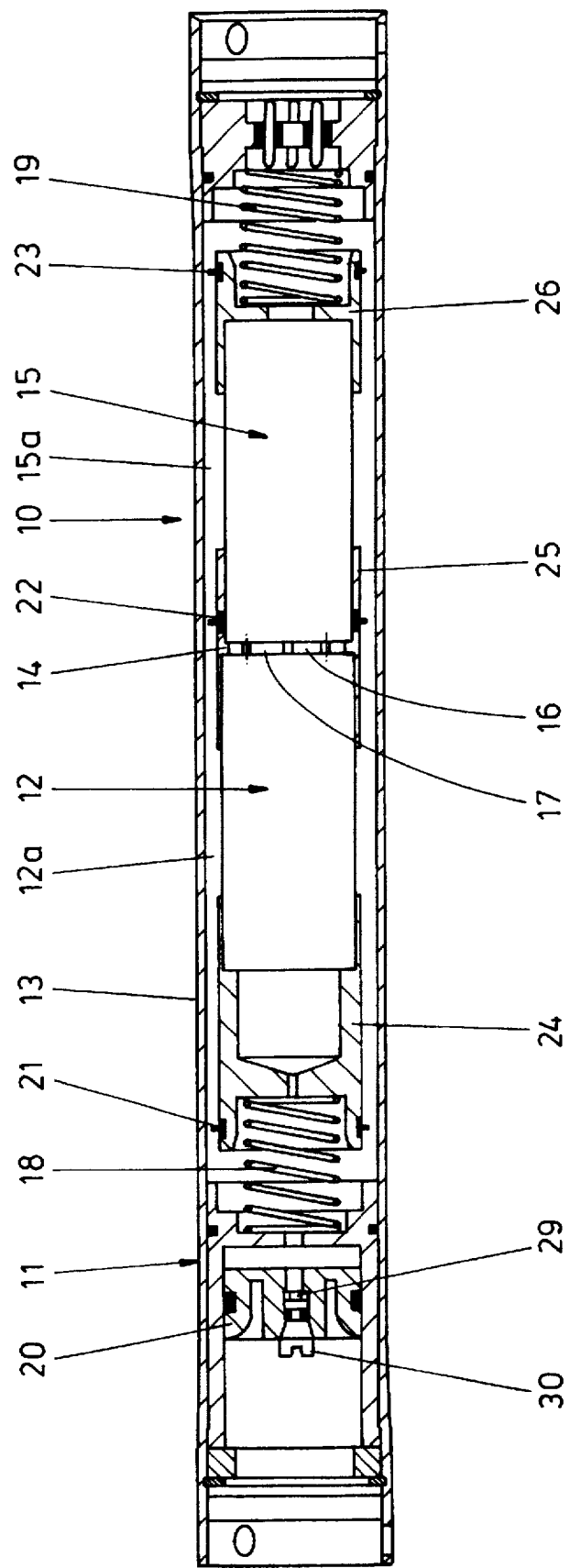
FIG. 2 is an enlarged view of one preferred embodiment of gamma ray detector and measurement device according to the invention, and showing the internal components in more detail.

Referring to FIG. 2, a scintillator module 12 is movably mounted in the housing 11 via carrier 24, and is arranged to respond to the presence of gamma rays in the local environment in which the device is located, and which rays pass through the wall 13 of the housing 11 and into the scintillator module 12. The gamma rays then cause an optical signal to be generated by the scintillator material, and which is transmitted as an optical output signal through an optical output 14 of the module 12.

An optical transducer module 15 is also movably mounted in the housing 11 via carrier 26 and has an input 16 arranged to receive the optical output signal from the scintillator module 12 and is able to convert the instantaneous optical output signal into a gamma ray measurement.

It will be noted from FIG. 2 that the output 14 and the input 16 are spaced close to each other, but do define a space 17 between them. The carriers 24 and 26 fasten the outer ends of the scintillator and optical transducer respectively to the resilient elements 18 and 19. A central carrier 25 is machined in such a way as to maintain the fixed separation between the scintillator and optical transducer, forming the space 17 which is intended to be filled with an optical fluid to improve the transmission of the optical signal from the output 14 to the input 16.

Figure 5A:
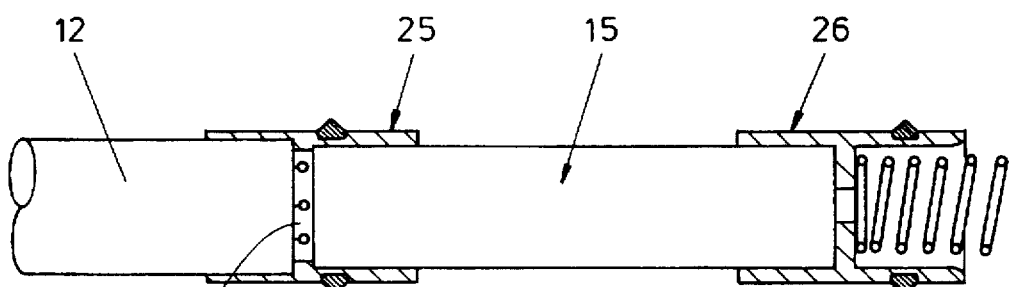
FIGS. 5A and 5B shows two alternative methods of mounting an optical transducer in the housing.
Figure 5B:
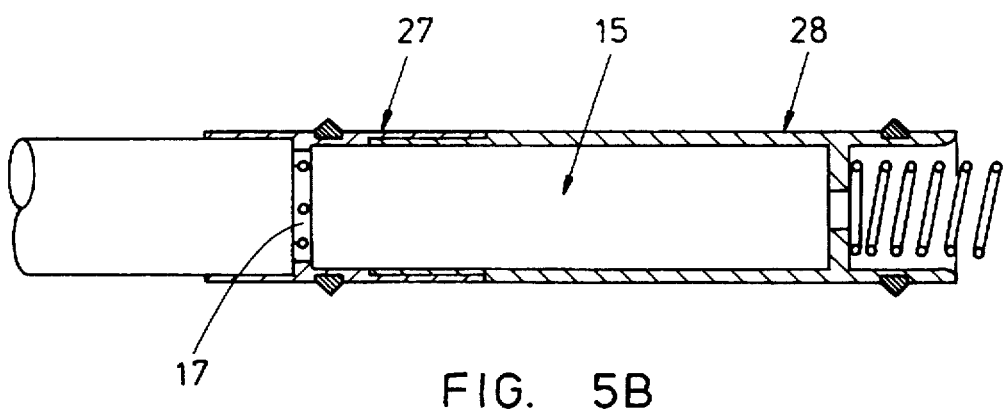

Alternatively, the carriers 25 and 26 may be replaced by the carriers shown as 27 and 28 in FIG. 5. In this configuration the space 17 is defined as described above, but the carriers 27 and 28 are in engagement with each other, forming a complete metallic shield around the optical transducer and increasing the available mechanical support. The selection of the appropriate carrier construction is dependent on the details of the manufacture of the optical transducer.

The optical fluid may be any suitable fluid known for use in coupling scintillators to optical transducers, for example the optical fluid made by Dow Corning and sold under the trade name Dow Corning 200 fluid, or a suitable hydrocarbon fluid It is known to use silicone fluid for coupling a photomultiplier to a crystal for example as described in the paper "Improvement of Time Resolution in a TOF PET System with the use of BaF$_2$ Crystals" by K Ishii, S Watanuki and H Orihara published in Nuclear Instruments and Methods in Physics Research A253, pp 128–134, and it is also known to use a hydrocarbon fluid, for example as described in the paper "Large Volume, High Efficiency Scintillation Detectors Using Multiple NaI(Tl) Crystal Pieces" by G. J. Fishman and D. M. Walker, published in Nuclear Instruments and Methods 107 (1973) pp 357–360.

In the illustrated embodiment, referring again to FIG. 2, each of the modules 12, 15 is mounted with lateral clearance within the housing 11 and thereby defines a respective housing chamber 12a, 15a respectively between the outer surface of the respective modules and the inner surface of cylindrical wall 13 of the housing 11, and each of which annular chambers 12a, 15a communicates with the space 17 defined between the output 14 and the input 16. However, it is a minimum requirement of the invention that at least one of the modules 12, 15 is mounted with lateral clearance within the housing 11, so as to define a housing chamber which communicates with space 17.

However, it should be understood that the mounting of one (or both) modules with lateral clearance within the housing is one preferred means of providing a required "housing chamber" to communicate with the space 17. For example, the housing chamber could be defined in a wall of the housing, or in a separate chamber mounted on the housing, provided that it has suitable fluid communication with the space 17.

According to one advantageous development, the housing (11) is effectively incorporated into the pressure housing of the drilling tool i.e. into the pressure barrel 300 of the arrangement shown in FIG. 3. This gives the advantage of further reducing the overall outside diameter, which is useful in some circumstances.

Given that there is communication between the chambers 12a, 15a and the space 17, upon filling of the space 17 with optical fluid, such fluid also fills the interior space of the housing 11 not occupied by the modules 12 and 15 and related components, and therefore there is a fluid between chambers 12a and 15a and within space 17.

For practical reasons it is convenient to evacuate the air from the assembly prior to filling it with fluid and this operation may be carried out using an adaptor connected to the bleed and fill port 29. In the illustrated embodiment the bleed and fill port is incorporated into the fluid expansion piston; but it may of course be fitted at any other convenient part of the assembly. After filling to the correct volume, the port 29 is closed and sealed by the bleed screw 30.

The modules 12 and 15 are coupled together rigidly to form a unit, maintaining a constant axial space between output 14 and input 16, which defines the space 17, and the unit formed by the modules 12 and 15 assembled together is capable of linear reciprocation within the housing 11 in the manner of slidable reciprocation of a piston within a cylinder. However, by reason of the filling of the interior of the housing 11 with optical fluid, upon reciprocation of the unit composed of modules 12 and 15, this exerts a pumping type of action on the fluid, causing reciprocating flow of optical fluid also within the housing 11. However, a flow restrictor is provided in the device, which communicates with at least one of the chambers 12a, 15a and/or with the space 17, and is arranged to restrict fluid flow therebetween for the purposes of damping the oscillating reciprocation of the unitary assembly of the modules.

Resilient means is also provided within the housing 11, to resist linear reciprocation of the unitary assembly, and in the illustrated embodiment comprises compression springs 18 and 19 which apply biasing forces to the outer ends of modules 12 and 15 respectively. The springs 18, 19 permit linear reciprocation of the unitary assembly, but provide progressively increasing resistance to movement in either direction axially of the housing 11. Compression springs 18 and 19 are merely one example of resilient means which may be provided in order to resist linear reciprocation of the unitary assembly. Other arrangements may be provided, including bellows or elastomeric stoppers or bungs.

To permit thermal expansion of the optical fluid, when the device 10 is exposed to localised relatively high temperature, a fluid expansion piston 20 is slidably mounted at one end of the housing 11 and which is movable in sealed manner to permit expansion of the optical fluid. It should be noted that the piston 20 does not need to be separately retained, since any tendency of the piston face to move away from the contained fluid is resisted by the atmpospheric pressure on the open face of the piston. Other arrangements may be provided, such as a flexible convoluted bellows.

When the interior of housing 11 is entirely filled with the optical fluid, this provides a dual function of the fluid, in that it serves both as means for improving the transmission of the optical signal from output 14 to input 16, but in addition it serves as a hydraulic damping medium somewhat in the manner of a telescopic hydraulic damper.

Furthermore, when the annular chambers 12a, 15a are filled with the optical fluid, this also provides cushioning against relative lateral displacement of the modules 12 and 15 when vibration energy, or shock loadings are applied to the housing 11 such as to cause relative transverse displacement of the modules 12 and 15.

In one embodiment of a first aspect of the invention, the optical fluid performs the dual function of improving transmission of the optical signal generated by the scintillator module 12, as well as forming a liquid pressure medium in a damping arrangement. However, in an embodiment within a further aspect of the invention, the optical fluid, or, in its place, a suitable elastomeric optical coupling medium, is located solely in the space 17 defined between output 14 and input 16, and a further liquid medium may fill the remainder of the internal space defined within housing 11. Furthermore, the modules 12 and 15 remain closely coupled together as a rigid unitary assembly, with the optical fluid or elastomeric coupling material located solely in space 17. The liquid pressure transmitting medium is caused to carry out reciprocating flow movements within the housing 11, and the restrictor (arranged internally or externally or housing 11) serves to restrict the rate of flow of the liquid pressure medium during linear reciprocation of the unitary assembly of the modules 12 and 15.

Figure 4A:
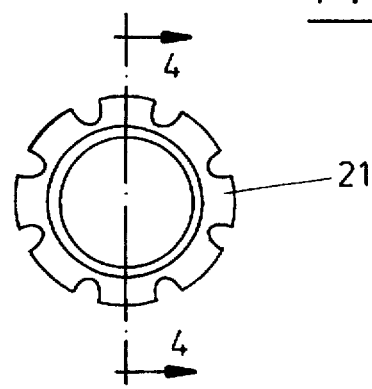
FIG. 4a is a front view of a design of fluid damping ring which may be used to mount slidably one or more components in the housing, and to retard movement of such compoent(s)
Figure 4B:
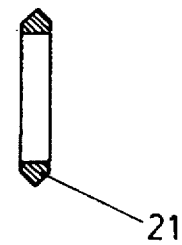

Any suitable arrangement of restrictor may be provided, and in the illustrated embodiment, by way of example only, the restrictor is formed by one or more peripheral seals mounted on the outer peripheries of the modules 12 and 15, and which effectively permit the modules 12 and 15 to exert a piston type of sliding motion within the housing 11. Seal 21 is shown at the axially outer end of module 12, and seals 22 and 23 are provided at the axially inner and axially outer ends of module 15 respectively. To provide a throttling action on the pressure transmitting medium, each seal 21, 22, 23 is formed with gaps or through flow apertures which exert a retardation action on the flow of fluid through the gaps or apertures thereby to dampen the oscillating movements of the unitary assembly of modules 12 and 15. By way of example, one possible configuration of the ring 21 is shown in FIGS. 4a and 4b. In this configuration the fluid restrictors are provided by the notches shown in the front view while additional protecion against lateral shock is provided by the tapering cross section of the ring shown in the sectional view.

Many other different arrangements of flow restrictor may be provided, internally or externally of the housing 11.

Any suitable scintillator may be provided, purchased as a proprietary component, to form the module 12. Similarly, any proprietary photo multiplier tube may be utilised to form the optical transducer module 15. Suppliers such as Bicron provide crystals in packages which are already ruggedised using techniques such as those described in U.S. Pat. Nos. 4,383,175 and 4,764,677. By further protecting such a crystal package from shock and vibration as disclosed in the present invention, its overall resistance to shock and vibration may be very substantially increased. Similarly, manufacturers of photomultiplier tubes, such as Thorn-EMI and Hammamatsu provide ruggedised versions of their products and the advantages of such devices can again be substantially increased by this invention.

The preferred materials incorporated within scintillator module 12, to convert gamma rays into photons, comprise inorganic scintillator material, or organic scintillator material. Examples of inorganic scintillator materials are thallium doped sodium iodide, and sodium doped caesium iodide, but it should be understood that any suitable scintillator material, including contained liquid scintillators, which are suitable for the temperature at which the device is to be operated, may be used.

We claim:

1. A gamma ray detector and measurement device which comprises:

a generally elongate housing;

a scintillator module movably mounted in said housing and arranged to respond to the presence of gamma rays in the local environment in which the device is located and which rays pass through the wall of the housing and into the scintillator module, said module having an optical output for transmitting an optical signal after conversion within the module of the incoming gamma rays; and an optical transducer module also movably mounted in the housing and having an input arranged to receive the optical output from the scintillator module, said transducer module being able to convert the instantaneous optical output into an electrical output corresponding to the energy and flux of the incoming gamma radiations as detected in the scintillator module;

in which the output of the scintillator modules and the input of the transducer module are closely spaced to each other, and define a space therebetween to be filled with an optical fluid to improve the transmission of the optical signal to the input of the transducer module;

characterized in that a housing chamber is defined in said housing and which is communicable with said space between the output of the scintillator module and the input of said transducer module, and in that a flow restrictor is in communication with said chamber and/or said space and is arranged, in use, to restrict fluid flow between the chamber and said space for the purpose of damping movement of either or both of said modules within said housing.

2. A device according to claim 1, in which said space and said housing chamber is filled with said optical fluid.

3. A device according to claim 1, in which the scintillator module and the optical transducer module are coupled rigidly together to define a constant space therebetween, and said modules are movable as a unit within the housing.

4. A device according to claim 3, including resilient means arranged within the housing to resist reciprocating movement of said unit.

5. A device according to claim 4, in which said resilient means comprises spring arrangements arranged at each end of the housing, and each applying inward biasing, directly or indirectly, to a respective one of the modules of said unit.

6. A device according to claim 1, including a fluid expansion piston mounted for sealed movement within said housing in order to provide compensation for thermal expansion of the optical fluid in service.

7. A device according to claim 1, in which the flow restrictor is arranged internally of the housing.

8. A device according to claim 7, in which each module is slidably mounted within the housing in the manner of a piston, and having at least on sealing ring mounted on its outer periphery to provide a piston type of movement, but in which at least one of said rings has one or more gaps or apertures formed in it to allow restricted fluid flow through it thereby to dampen the movement of the modules.

9. A device according to claim 1, in which at least one of said modules is mounted with lateral clearance within said housing to define said housing chamber.

10. A device according to claim 9, in which the housing is of circular cross-section, and each module is of circular cross-section and of smaller diameter, to define annular chambers between the inner wall of the housing and the outer surface of each modules, and which is filled with said optical fluid.

11. A gamma ray detection and measurement device which comprises:

a generally elongate housing;

a scintillator module mounted for linear reciprocation in said housing and arranged to respond to the presence of gamma rays in the local environment in which of the housing and into the scintillator module, said module having an optical output for transmitting an optical signal after the incoming gamma rays have been converted within the module; and an optical transducer module also mounted for linear reciprocation in the housing and having an input arranged to receive the optical output signal from the scintillator module, said transducer module being able to convert the instantaneous optical output signal into a gamma ray measurement;

in which the optical output of the scintillator module and the input of the transducer module are closely spaced to each other and define a space therebetween to be filled with an optical fluid, or an elastomeric optical coupling medium, to improve the transmission of the optical signal to the input of the transducer module;

the device being characterized in that:

a. the modules are coupled rigidly together as a unit for joint linear reciprocating movement in said housing;

b. resilient means is mounted in the housing to resist the linear reciprocation movement of said unit;

c. a pressure chamber is defined in said housing to contain a liquid damping medium which is exposed to pressure action upon reciprocation of said unit; and d. a flow restrictor is in communication with said pressure chamber, directly or indirectly, to restrict flow of the damping medium through the restrictor upon reciprocation of said unit and thereby to damp the reciprocating movement of the unit.

12. A device according to claim 11 and incorporated in a drilling tool.

13. A device according to claim 1 and incorporated in a drilling tool.

14. A device according to claim 12, in which the housing forms a portion of the pressure housing of the tool.

15. A device according to claim 13, in which the housing forms a portion of the pressure housing of the tool.

\* \* \* \* \*